United States Patent [19]
Zandveld et al.

[11] Patent Number: 5,212,776
[45] Date of Patent: May 18, 1993

[54] COMPUTER SYSTEM COMPRISING A MAIN BUS AND AN ADDITIONAL COMMUNICATION MEANS DIRECTLY CONNECTED BETWEEN PROCESSOR AND MAIN MEMORY

[75] Inventors: Frederik Zandveld; J. A. G. M. Kindervater, both of Apeldoorn, Netherlands

[73] Assignee: Digital Equipment Corporation, Maynard, Mass.

[21] Appl. No.: 333,058

[22] Filed: Apr. 3, 1989

[30] Foreign Application Priority Data

Apr. 5, 1988 [NL] Netherlands ............... 8800858

[51] Int. Cl.⁵ ........................... G06F 13/38
[52] U.S. Cl. ..................... 395/325; 395/425; 364/DIG. 1; 364/240.2; 364/238.4; 364/254.3
[58] Field of Search ......... 364/940.0, 238.4, 200; 395/325, 425, 800

[56] References Cited

U.S. PATENT DOCUMENTS

| | | | |
|---|---|---|---|
| 3,854,126 | 12/1974 | Gray et al. | 364/200 |
| 4,149,239 | 4/1979 | Jenkins et al. | 364/200 |
| 4,151,593 | 6/1977 | Jenkins et al. | 364/200 |
| 4,264,953 | 4/1981 | Douglas et al. | 364/DIG. 1 |
| 4,322,795 | 3/1982 | Lange et al. | 364/200 |
| 4,357,656 | 11/1982 | Saltz et al. | 364/200 |
| 4,386,402 | 5/1983 | Toy | 364/DIG. 1 |
| 4,481,573 | 11/1984 | Fukunaga et al. | 364/DIG. 1 |
| 4,527,237 | 7/1985 | Frieder et al. | 364/200 |
| 4,550,368 | 10/1985 | Bechtolsheim | 364/200 |
| 4,635,193 | 1/1987 | Moyer et al. | 364/200 |
| 4,648,033 | 3/1987 | Lewis et al. | 364/200 |
| 4,757,439 | 7/1988 | Stinson et al. | 364/DIG. 1 |
| 4,785,414 | 11/1988 | Hemdal | 364/900 |
| 4,794,521 | 12/1988 | Ziegler et al. | 364/200 |
| 4,872,110 | 10/1989 | Smith et al. | 364/200 |
| 4,920,477 | 4/1990 | Colwell et al. | 364/200 |
| 4,928,224 | 5/1990 | Zulian | 364/200 |
| 4,930,106 | 5/1990 | Danilenko et al. | 365/189.01 |

Primary Examiner—Thomas M. Heckler
Attorney, Agent, or Firm—Ronald E. Myrick; Barry N. Young; Ronald C. Hudgens

[57] ABSTRACT

A processor in a computer system is connected, together with one or more control units of peripheral apparatus, to the main memory via a main bus. For a very fast processor the storage capacity of the main memory should be so high that the full physical address can no longer be transported via the main bus in one operation. In that case an additional communication line is provided between the processor and the main memory. In order to enable peripheral apparatus to access the entire main memory anyway, a second memory management unit is connected between the main bus and the main memory.

16 Claims, 6 Drawing Sheets

COMPUTER SYSTEM COMPRISING A MAIN BUS AND AN ADDITIONAL COMMUNICATION MEANS DIRECTLY CONNECTED BETWEEN PROCESSOR AND MAIN MEMORY

BACKGROUND OF THE INVENTION

The invention relates to a computer system, comprising a main bus interconnecting a main memory and at least one control unit, which is for controlling an asscociated peripheral apparatus, a processor having logic address generating means, and a first memory management control unit for receiving said logic address for conversion into an associated physical address, communication means for communicating said physical address to said main memory and associated data between said main memory and the processor.

The following description is based specifically on the so-called VME-bus standard which is also generally known as IEC 821 bus and IEEE P1014, details of which are given in the VME-bus Specification Manual, revision C, February 1985, published by the VME-bus Manufacturers Group. As is known, the processor may comprise its own foreground memory, for example a cache memory. The main memory consists of RAM modules, possibly organized in memory banks, and has a capacity of, for example 16 Mbytes. In principle 24 address bits then suffice; the width of the main bus will usually be sufficient for transporting this address in parallel. The 24 bits can represent a logic address as well as a physical address. A physical address directly specifies a given memory location. A logic address comprises, for example a page/segment indication, together with offset information. On this logic address the first memory management control unit performs a conversion operation. When the main memory is composed of dynamic RAM memory modules, it also comprises a refresh organization of some kind. When a given memory location has not been addressed for an excessively long period of time, a refresh access is scheduled. A two-port access element enables the intermingled execution of user accesses and refresh accesses.

SUMMARY OF THE INVENTION

Contemporary processors, are becoming ever faster. It has been found that the capacity of the main memory should, therefore, become increasingly higher. A reasonable maximum capacity appears to be 10 Mbyte/MIPS (million instructions per second). For processors having a processing speed in the range of from 0.4 MIPS to 3 MIPS, a 4-30 Mbyte main memory must be provided. Beyond 16 Mbyte an address width of 24 bits no longer suffices. The width of the main bus may be increased, but this implies additional wiring. Thus, in addition to a 24/16 bit VME-bus (24-bit addresses, 16-bit data) there is also defined a 32/32 bit version. The width of the main bus must then increase directly by 8 bits. A more serious objection is that in the case of a widened main bus the compatibility with existing stations, such as the control units for the peripheral apparatus, may be lost. The latter are not suitable for addressing the extended memory via the widened bus, because they can only produce a limited address length. The additional address bits would thus necessitate a complex additional facility.

Among other things, it is an object of the invention to provide a simple organization whereby the memory capacity can be increased by a factor, without it being necessary to make the main bus wider and without additional steps being required outside the processor/main memory dyad. This object is achieved in accordance with the invention in that a second memory management control unit is provided for receiving a first bus-communicated address for conversion into its associated physical address and in that said communication means comprise an address path that is wider than an address width of the main bus and external to the main bus.

The "normal" access of the processor to the main memory then bypasses the main bus. On the other hand, use can be made of standardized control units for peripheral apparatus which supply logic addresses of fixed width, for example 24 bits. It is also permissible for the processor to supply such addresses to the main memory via the main bus, for thereto forwarding a processor-generated bus-communicated address that is shorter than said physical address. It has been found that the latter is attractive solution, notably for diagnostic programs. The first memory management control unit allows for logic processor addresses which may have a greater length, notably in the case of 32-bit processors, to be translated into physical addresses which are capable of addressing the total physical storage capacity of the memory; the physical address will often contain less than 32 bits. The diagnostic-program addresses on the main bus then have the shorter length, such as 24 bits.

Further attractive aspects of the invention are recited in dependent claims.

BRIEF DESCRIPTION OF THE FIGURE

The invention will be described in detail hereinafter with reference to the following figures.

DESCRIPTION OF A PREFERRED EMBODIMENT

Figure 1:
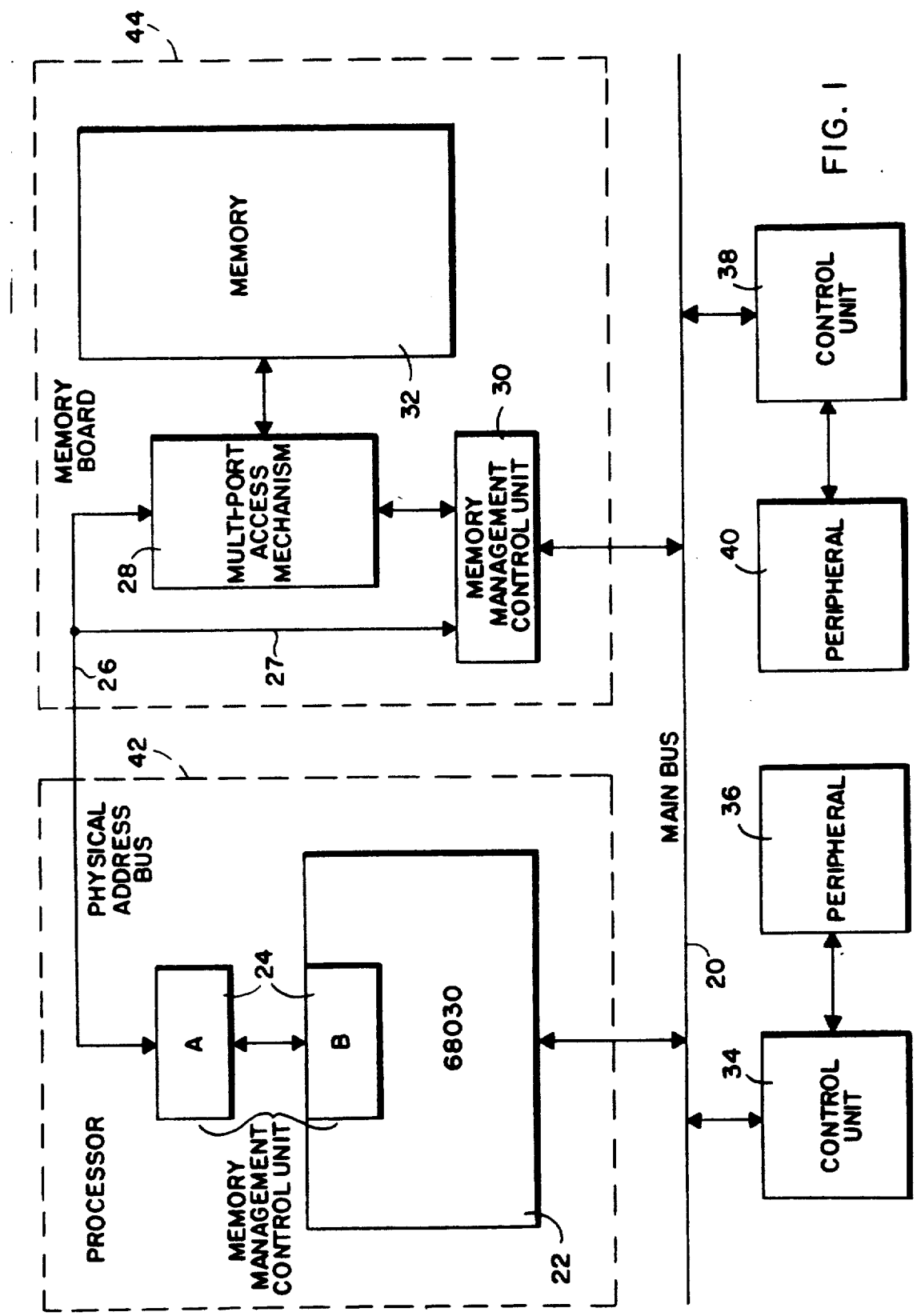
FIG. 1 shows a simplified block diagram of a first embodiment of a computer system in accordance with the invention.

The Figure shows a simplified block diagram of a computer system in accordance with the invention. The component 20 is a main bus. The main bus is suitable for the transport of addresses having a width of, for example 24 bits. It is also suitable for the transport of data, for example having a width of 16 bits. The main bus may be organized in various ways, for example data and addresses on different lines, data and addresses on the same lines in an alternating fashion, or in a block-wise alternating fashion, each address then being capable of initiating a series of data transports by way of a counting mechanism in the main memory. Block 42 denotes a board accommodating various integrated circuit modules which are connected to one another and to the environment in one way or another and which together constitute the processor. The core of this processor is formed, for example by a microprocessor 22 of the type Motorola 68030. This board also accommodates a memory management control unit function which is represented by the block 24. The section B thereof is realized by the processor part 22 in said microprocessor. The section A is a separate circuit for implementing the further memory management control (MMU) function. For the microprocessor 68030 reference is made to the manufacturer's specifications. For the sake of simplicity, further parts of the processor are not shown. The block 24 has inter alia the following functions:

Section A is an interface to memory board 44;

in section B processing results of the processor function which have for example a length of 32 bits and which contain a logic address, are translated into a physical address; the length of the physical address amounts to more than 24 bits, for example 28 bits;

in section B at least one of control bits is added to the logic address. In section B these control bits are added as three function bits; they relate notably to the selection of elements which do not form part of the main memory (for example, a PROM memory). To simplify the figure these elements are not illustrated. Furthermore, these function bits are used for controlling the input/output equipment and for a set mechanism for the main memory, see the specifications of the manufacturer of the microprocessor.

The physical address is output on line 26; like the bus 20, this line may be suitable for bidirectional data transport as well as unidirectional address transport. These two functions, however, can again be separated; this is not shown for the sake of brevity. The advantage of a greater address width is of course, that a larger memory can be directly addressed. Furthermore, the direct connection between the processor and the main memory is faster than a connection via the main bus. When data is transported via the same physical connections as the addresses, the bus must also be sufficiently wide for the data. A standard address bit width is 24 bits. Now, the address length can be increased to, for example 28 bits. The significance of the data bits will not be discussed herein. In the relationship processor/main memory the processor always acts as the master station and the main memory always acts as the slave station.

The other elements of the processor board, i.e. in addition to the actual microprocessor and the memory management unit, have been omitted for the sake of simplicity.

The bus 20 transports addresses to the memory. These addresses may originate from the processor board 42 in case of a diagnostic program. The addresses may, alternatively, be supplied by the control units 34, 38 of respective peripheral apparatus 36, 40. This apparatus may be disc memories, data communication stations, printers or other apparatus. This apparatus always supplies bus addresses of for example, no more than 24 bits.

Element 30 is a memory management control unit. It is accommodated on memory board 44 together with the blocks 28, 32. Unit 30 translates the 24-bit bus addresses into physical addresses which have a length of, for example, at the most 28 bits. A known page or segment organization can then be implemented. To this end, the element 30 comprises, for example a page table or segment table. The setting, i.e. filling, of this table can be realized via a line 26 as indicated by a special branch 27. Setting can also be realized via the main bus 20. Depending on the possibilities offered by the hardware and the software, one version or the other will be preferred. In case of page organization, the bus address may comprise an offset indication and a page reference.

The originally generated logic address also may comprise the offset and a page reference. Now, because as the main bus is narrower than the processor output, a limited selection of the total complement of pages is directly accessible via the main bus. For example, in case of 16 Kbyte pages, an offset of 14 bits is needed. Along the main bus, then 1 K different pages are addressable. An address path width of 28 bits on line 26 allows 16 K different pages to be addressable. The presetting of the page table preferably is effected by the processor.

The physical addresses received from the elements 30, 24 are applied to the memory 32 in accordance with a granting mechanism of one kind or another in order to address a memory location. To this end there is provided a multi-port access element 28; this element can receive two kinds of physical addresses for external access. In the case of dynamic RAM modules in the block 32, refresh addresses are also required in order to sustain the memory integrity. For example refresh addresses may address the visions of the memory 32 by cyclical incrementation. These refresh addresses cycle through the memory for example, once every 2 ms. The element 28 comprises an access mechanism for making a selection between the various memory accesses. Selection can be performed in various ways. A first possibility consists in always giving the addresses on the line 26 priority over the two other lines, unless the refresh organization is urgent. In the latter case the refresh organization has the priority. When the additional communication line comprises separate address and data lines, the data line is also connected to the access mechanism in block 28. The conversion from logic addresses to bus addresses may also be executed by the first memory management control unit.

Figure 2:
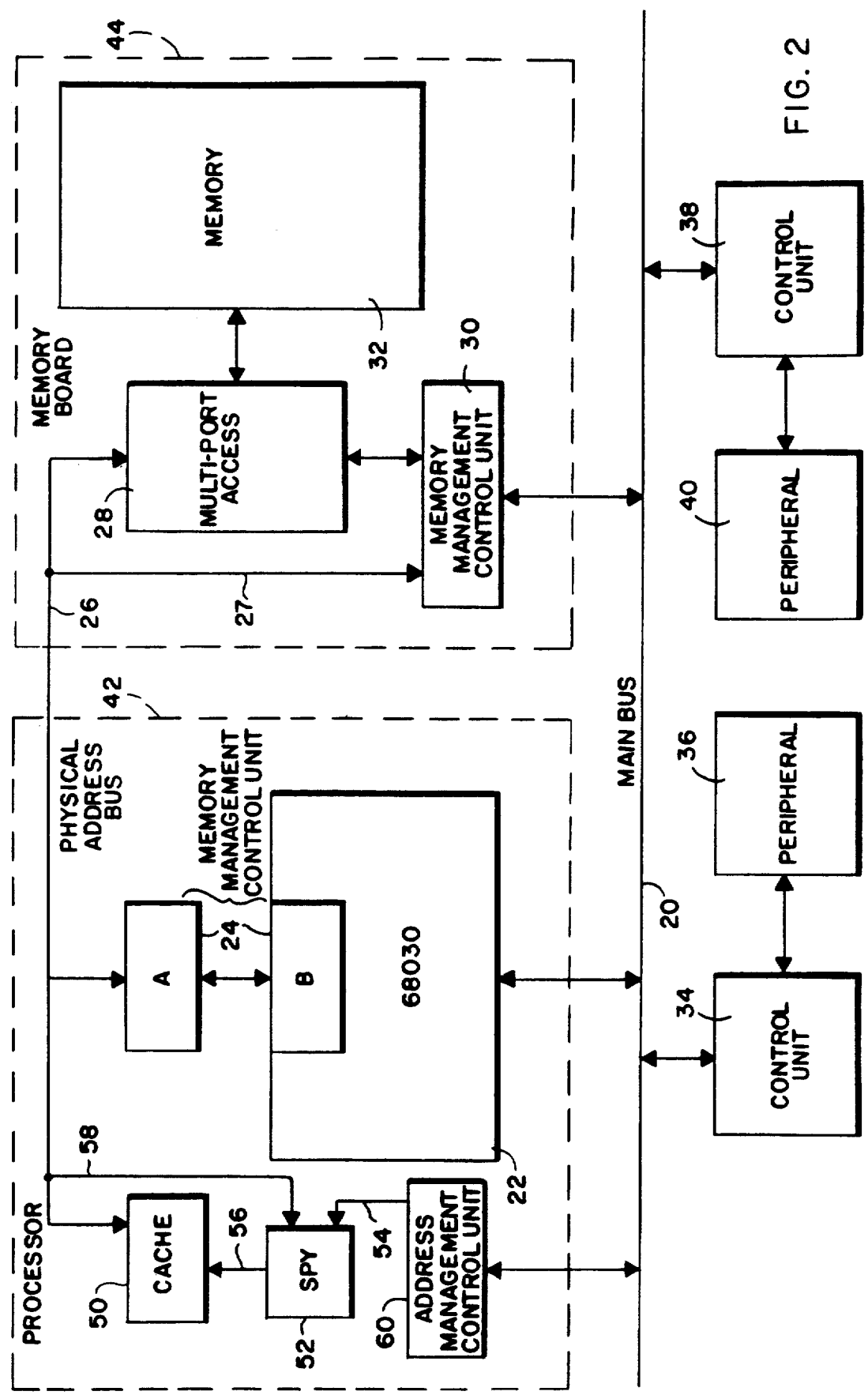
FIG. 2 shows a second embodiment using a cache memory and an address spy mechanism.

The facility of FIG. 2 is usually also required, in case the processor is provided with a cache or foreground memory 50, such as the Motorola 68030. Often, such foreground memory contains given data of the main memory in duplicate. Thus, two conflict situations may arise:

a. a peripheral apparatus modifies data in the main memory. When this data has been previously copied to the foreground memory, the data in the foreground memory becomes "outdated". This problem can be solved in two ways. First of all, modification of such copied data in the main memory by the software can be forbidden. This is a prescription that is difficult to adhere to. Secondly, an address spy element 52 may be connected 54 to the main bus. When the relevant address appears on the main bus, the foreground memory is activated 56. Activation may mean two things:

a1: the data of the foreground memory is invalidated a2: the data of the main memory is copied again.

b. the processor modifies data in the foreground memory. This problem can be solved in three ways. The first method is the same as that set forth in sub-paragraph a, but is difficult to realize by way of software. The second possibility is again the use 58 of an address spy element: in that case the relevant data in the main memory must be declared invalid. The simplest method, however, is for each write operation in the foreground memory to be copied directly to the main memory (store through).

Figure 3:
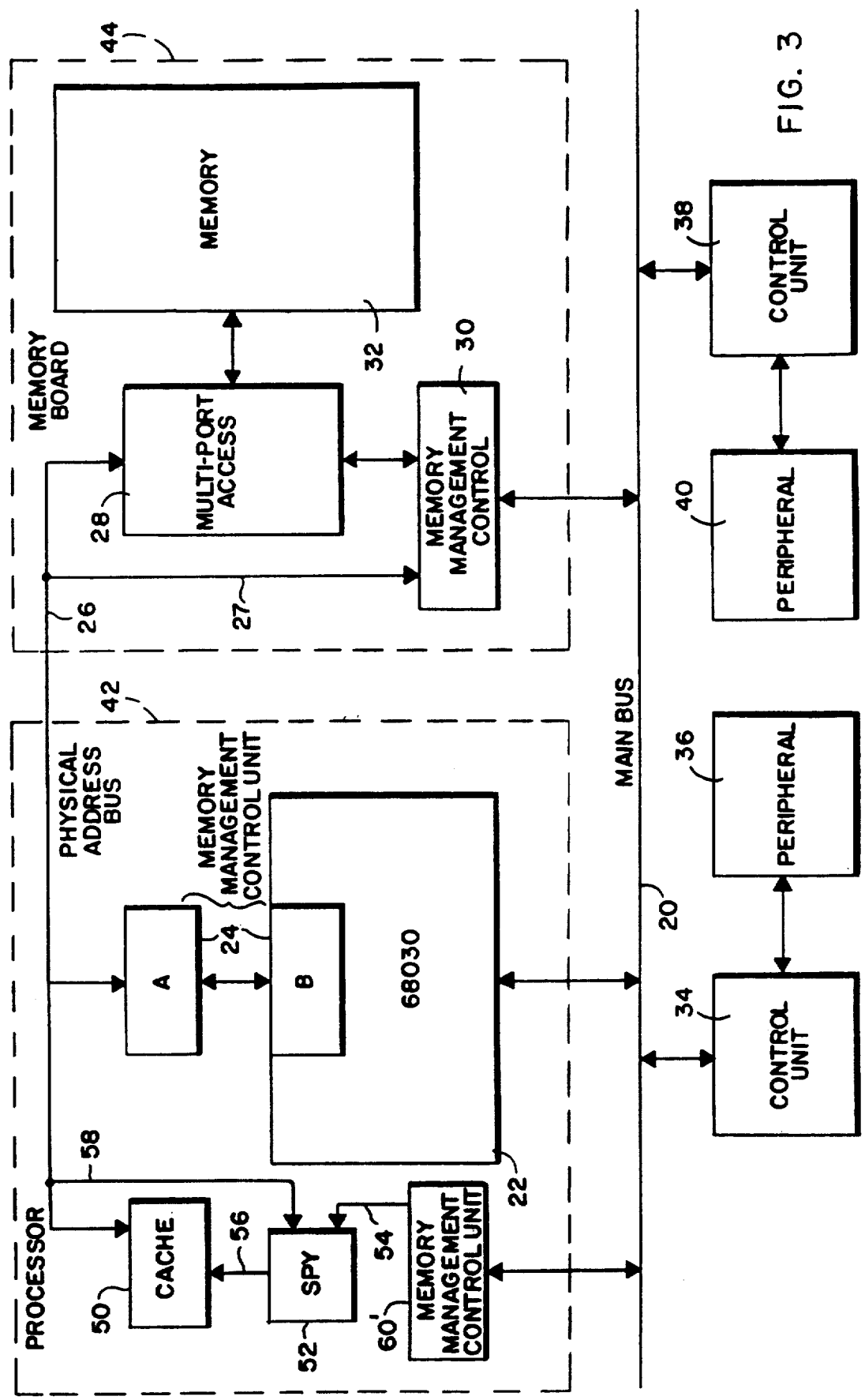
FIG. 3 shows a third embodiment in which an address spy uses logic addresses from the processor.
Figure 4:
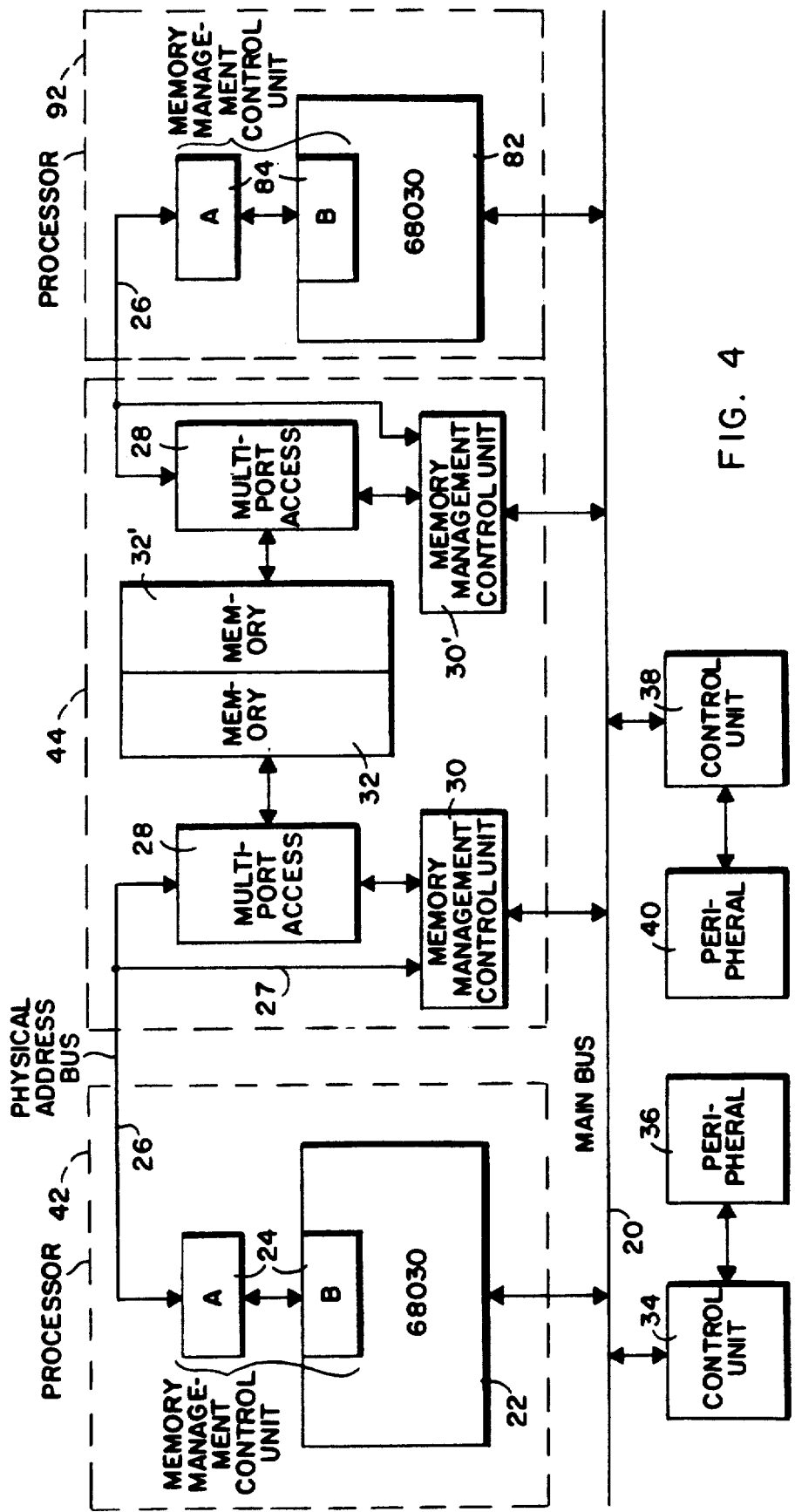
FIGS. 4-6 show embodiments with a second processor.

A control unit of a peripheral apparatus supplies bus addresses for transport on the main bus. The processor supplies logic addresses which are converted into physical addresses prior to the transport via the additional communication line. When the foreground memory can be addressed by the same physical addresses, the address spy must be connected to the main bus via a third address management control unit 60. This unit has the same logic function as the memory management control unit 30. In this case the foreground memory will geographically form part of the connection 26. As shown in FIG. 3, the foreground memory may also be addressable 62 by logic processor addresses. Because the structure of these logic addresses may differ from that of the logic addresses to be supplied by the peripheral apparatus, a special memory management control unit 60 must then be arranged between the main bus and the address spy element. This special memory management control unit differs from the second memory management control unit so that it must be developed separately. Therefore, the first solution is cheaper. The address spies are known per se and comprise, for example a comparison or association mechanism.

Figure 5:
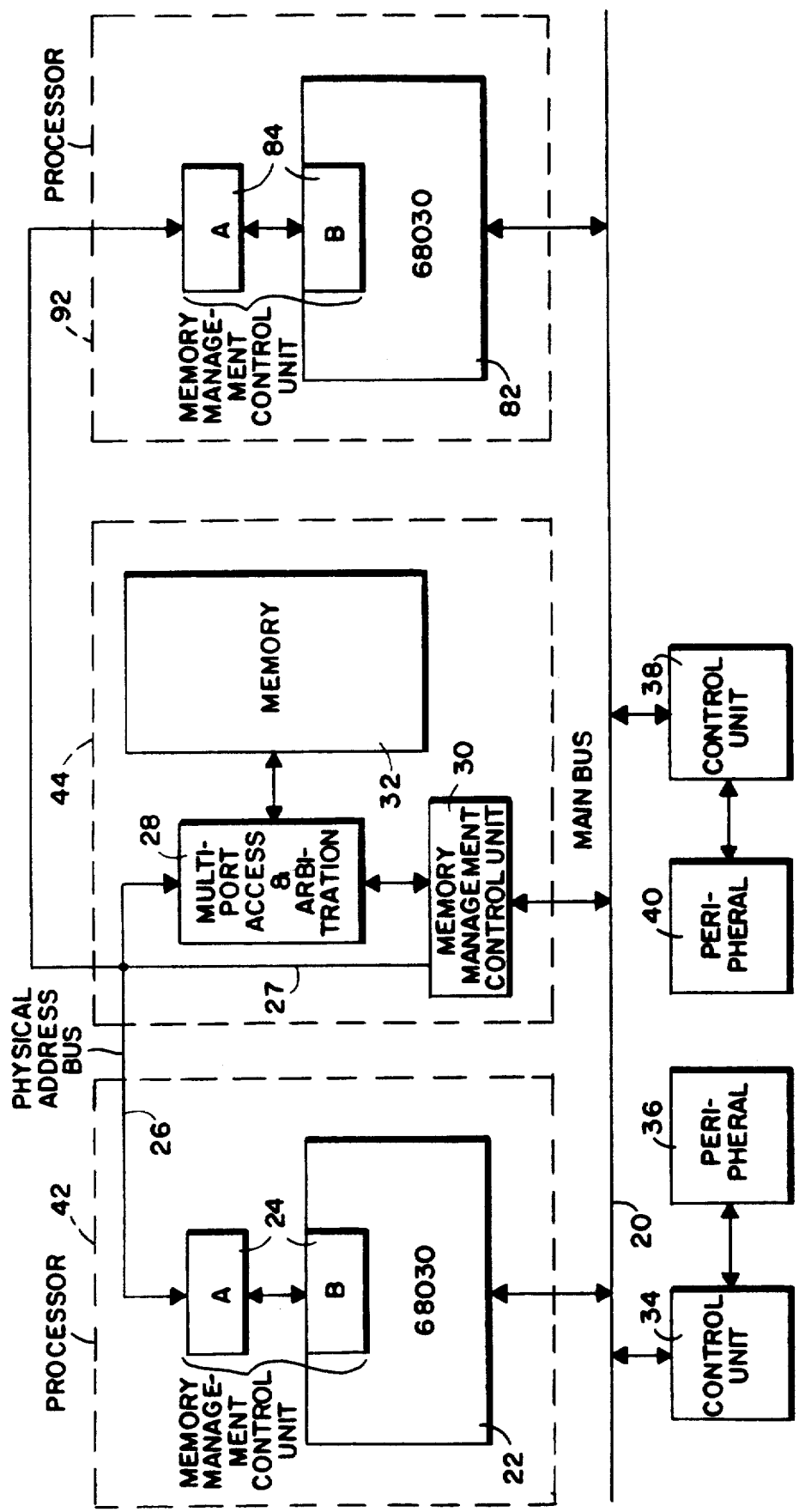
Figure 6:
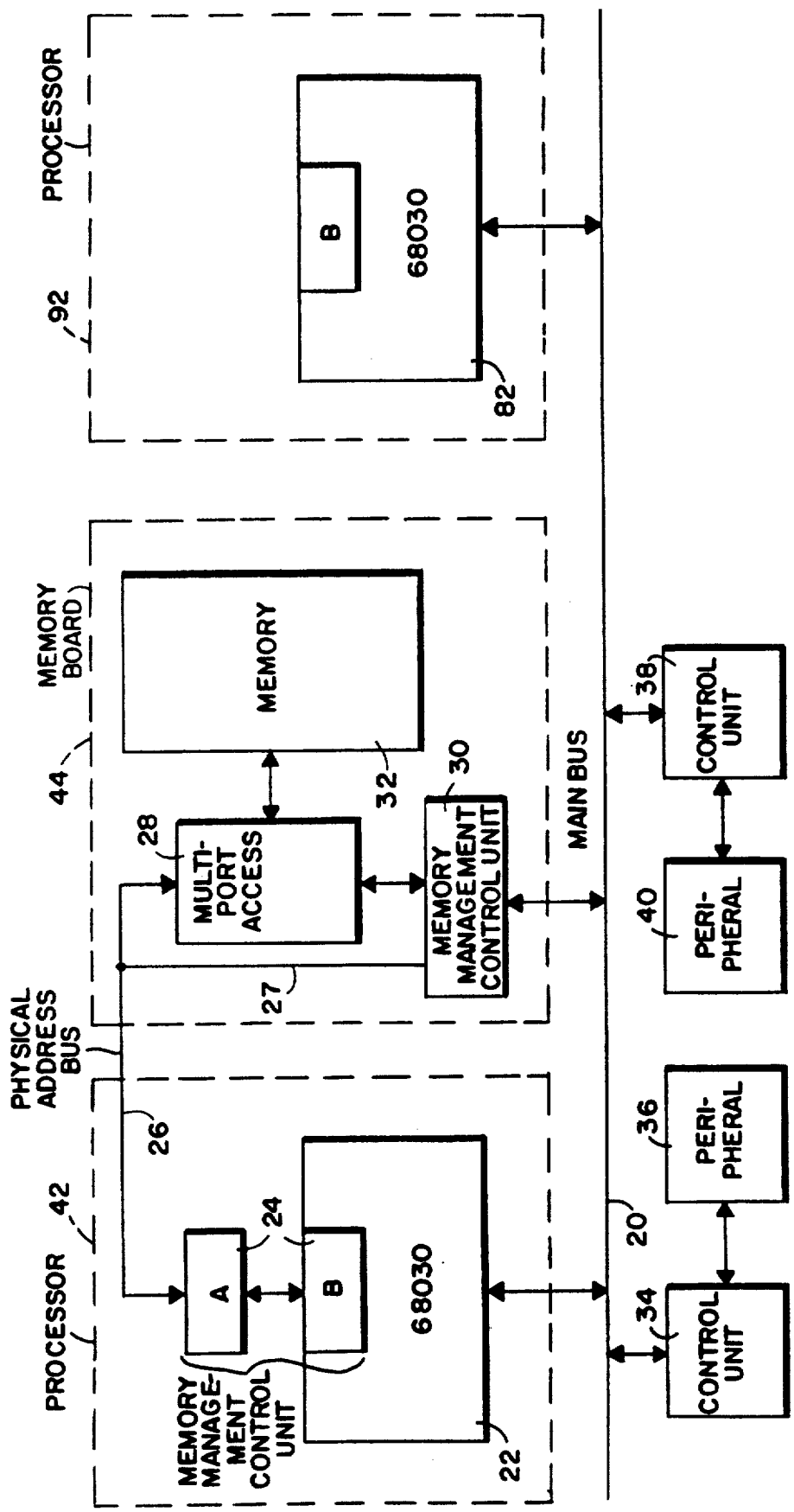

Other mechanisms are also feasible. For example, the foreground memory may be subdivided into more hierarchic layers. However, this will be ignored herein. Further extensions are possible. For example, two processors 42, 92 may be present. In accordance with a first solution as shown in FIG. 6, only one processor is then connected to the additional address line. This offers very fast memory access for the relevant processor, because it is not necessary to execute a priority protocol: in that case no delay is introduced either by the elements which determine and check the priority. A second solution as shown in FIG. 5 consists in that both processors are connected to the additional address lines, the memory access being dependent to an arbitration mechanism. This makes the memory access slower. Another solution consists in that the main memory is subdivided into two sections, each of which comprises its own address line 26, 26' in order to be directly addressable by the associated processor. A processor wishing to address the other memory section should do so via the main bus.

I claim:

1. A computer system, comprising
a main bus interconnecting a main memory and at least one control unit for controlling an associated peripheral apparatus,
a processor having logical address generating means, and a first memory management control unit for receiving said logical address for conversion into an associated physical address,
communicating means for communicating said physical address to said main memory and associated data between said main memory and the processor, characterized in that
a second memory management control unit is provided for receiving a first bus-communicated logical address from the main bus for conversion into its associated physical address and
said communication means comprise an address path that is wider than an address width of the main bus, said address path being external to the main bus.

2. A computer system as claimed in claim 1, characterized in that the processor is connected to the communication means by way of a foreground memory in order to copy therein data from the main memory, the processor comprising an address spy element for detecting a logical address originating from any control unit for a peripheral apparatus and intended for the main memory, and for activating the foreground memory when the memory location thus addressed has been copied in the foreground memory.

3. A computer system as claimed in claim 2, characterized in that the address spy element responds exclusively to a write access.

4. A computer system as claimed in claim 3, characterized in that, when the foreground memory is addressable by physical main memory addresses, the address spy element is connected to the main bus via a third memory management control unit which corresponds to the second memory management control unit.

5. A computer system as claimed in claim 4, characterized in that said activation comprises the invalidation of any associated contents of the foreground memory.

6. A computer system as claimed in claim 2, characterized in that, when the foreground memory is addressable by physical main memory addresses, the address spy element is connected to the main bus via a third memory management control unit which corresponds to the second memory management control unit.

7. A computer system as claimed in claim 1, characterized in that said processor is coupled to the main bus for thereto forwarding a processor-generated bus-communicated address that is shorter than said physical address.

8. A computer system as claimed in claim 1 characterized in that the main memory comprises a multi-port access element which is connected in parallel to the second memory management control unit and to the communication means.

9. A computer system comprising
a main bus for communicating logical addresses;
a processor, coupled with the main bus;
a memory;
at least one peripheral unit coupled with the main bus;
communication means for communicating a physical address to the memory, the communication means including an address path external to the main bus, the address path being wider than an address width of the main bus;
first memory management means, disposed within the processor and coupled with the communication means, for converting a logical address from the processor to a physical address; and
second memory management means coupled between the memory and the main bus,
whereby the memory is larger than the number of addresses which can be transmitted on the main bus and whereby the processor addresses all of the memory via the communication means while the peripheral unit addresses the memory via the main bus so that the memory has an apparent size smaller than its actual size.

10. The system of claim 9 comprising access means for loading a page and/or segmentation table into the second memory management means, whereby the second memory management means uses a different page and/or segment from the first memory management means.

11. A computer system as claimed in claim 10 characterized in that said access mechanism acts via the main bus.

12. A computer system as claimed in claim 10, characterized in that said access mechanism acts via the communication means.

13. The system of claim 9 wherein the processor comprises a foreground memory; and an address spy for detecting logical write addresses on the main bus from the peripheral unit and for detecting when such write addresses access portions of the memory previously copied into the foreground memory.

14. The system of claim 13 wherein the foreground memory is addressable by physical addresses, the system further comprising third memory management means coupled between the spy and the main bus for converting the logical write addresses to physical addresses.

15. The system of claim 9 wherein the processor is coupled to the main bus for providing thereto the logical address which is shorter than the physical address, whereby the processor emulates the peripheral unit for diagnostic purposes.

16. The system of claim 9 comprising a multi-port access element for accessing the memory, the element being coupled to receive addresses from both the connection means and the second memory management means.

* * * * *